Oct. 19, 1937.   A. C. CATLAND   2,096,447
METHOD FOR REPAIRING WELL TOOLS
Filed July 22, 1935
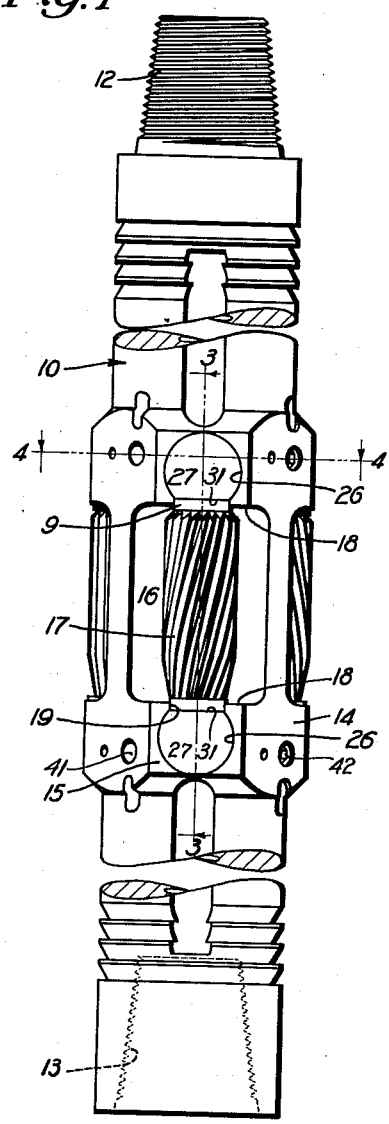
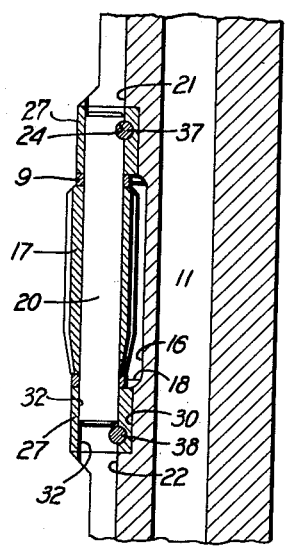
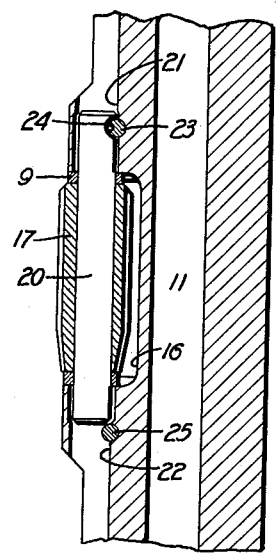
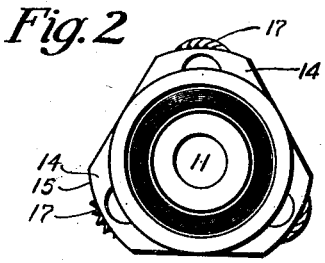
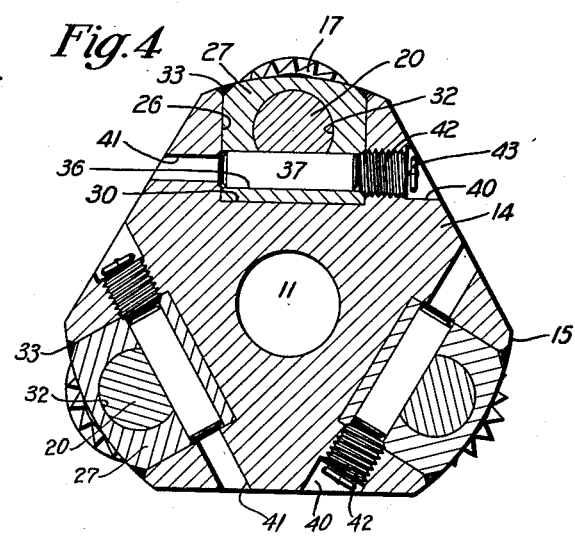
ALFRED C. CATLAND
INVENTOR
PER
ATTORNEY Patented Oct. 19, 1937

2,096,447

UNITED STATES PATENT OFFICE 2,096,447

METHOD FOR REPAIRING WELL TOOLS

Alfred C. Catland, Alhambra, Calif., assignor to Globe Oil Tools Company, Los Nietos, Calif., a corporation of California Application July 22, 1935, Serial No. 32,577

2 Claims. (Cl. 76—108)

This invention relates to a method for repairing tools and relates more particularly to a method for repairing well reamers of the type employed in the rotary method of well drilling.

Well reamers usually embody cutters rotatable on pins whose end portions are carried in openings in the reamer body. During the operation of such a reamer the cutter carrying pins are subjected to heavy thrusts and severe hammering. The material of which the reamer body is formed is not hard enough to withstand this action and the openings receiving the end portions of the cutter carrying pins soon become worn out of round and oversized. This necessitates the building up of the body by welding or the like and the reboring of the openings to receive the pins. Reamers have been introduced having hard bushings in the openings of the body to receive the end portions of the cutter carrying pins. The use of such bushings is not altogether satisfactory, especially in small size reamers where there is insufficient space for bushings having proper wall thickness to be practical.

A general object of this invention is to provide a simple, practical method for repairing a well reamer whose openings for receiving the cutter carrying pins have become oversized or out of round.

Another object of this invention is to provide a rapid inexpensive method for repairing the shank or body of a well reamer whose pin receiving openings have become worn, which method may be readily carried out by the simple tools found in small field machine shops, etc.

Another object of this invention is to provide a method for repairing a well reamer body whose pin receiving openings have become worn that insures the proper dependable mounting of the cutters on the repaired tools.

Another object of this invention is to provide a method for repairing a worn well reamer that makes the repaired body or shank very long wearing so that it is adapted for extensive use before requiring a second repair or reconditioning.

Another object of this invention is to provide a method of the character mentioned for repairing a worn well reamer that provides the reamer body with hard inserts for carrying the opposite ends of the cutter carrying pins which inserts are very long wearing and properly and dependably carry the pins so that they are not subjected to loss or displacement.

Another object of this invention is to provide a method of the character mentioned that repairs the reamer shank so that it may be easily and quickly reconditioned or repaired from time to time as may become necessary.

The various objects and features of my invention will be fully understood from the following detailed description of a typical manner of carrying out the method of the invention, throughout which description reference is made to the accompanying drawing, in which:

Fig. 1 is a side elevation of a well reamer that has been repaired by the method provided by this invention. Fig. 2 is a bottom view of the reamer shown in Fig. 1. Fig. 3 is a fragmentary vertical detailed sectional view taken substantially as indicated by line 3—3 on Fig. 1. Fig. 4 is an enlarged transverse detailed sectional view taken as indicated by line 4—4 on Fig. 1 and Fig. 5 is a view similar to Fig. 3 illustrating the worn parts before the reamer has been repaired.

While the method provided by this invention is adapted to be employed for repairing well tools of various characters it is particularly adapted for use in repairing well reamers having cutters rotatable on removable or replaceable pins. Accordingly, I will confine the present disclosure to a description of a typical manner of carrying out the method in repairing a reamer of this class, it being understood that the invention is not to be construed as limited or restricted to the specific use or application herein described.

The particular well reamer illustrated in the drawing includes a shank or body 10 adapted to be connected in a drilling string and having a longitudinal fluid passage 11 for conducting the rotary mud usually employed in the rotary method of well drilling. A threaded pin 12 is provided at one end of the body 10 for connecting with a part of the drilling string and a threaded socket 13 is provided in the other end of the body to receive a pin on an adjacent part of the string. The opposite end portions of the shank 10 may be substantially cylindrical while the intermediate portion 14 of the shank is substantially triangular in transverse cross section. The apices of the triangular portion 14 are flattened or rounded off having rounded surfaces 15 and sockets or recesses 16 are provided in the apex parts to partially carry or receive the reamer cutters 17. The upper and lower walls 18 of the recesses 16 are substantially horizontal and are provided with flat walled notches or recesses 19.

In accordance with the usual practice the cutters 17 are rotatable about vertical or longitudinally extending pins 20. As shown in Fig. 5 of the drawing openings 21 and 22 are provided in the portion 14 of the body 10 to communicate with the upper and lower ends respectively, of the recesses 16 to receive the upper and lower portions of the pins 20. The openings 21 and 22 extend to the upper and lower ends, respectively, of the triangular portion 14 and continue as grooves in the exterior of the shank or body 10 to permit the easy insertion and removal of the pins 20. Flat sided washers 9 are arranged in the correspondingly shaped recesses 19 at the upper and lower ends of the cutters 17 to receive the end thrusts from the cutters. As the parts of the reamer are originally assembled as shown in Fig. 5 of the drawing lock screws or pins 23 are arranged in transverse openings in the body portion 14 to cooperate with notches 24 in the pins 20 to lock the pins against rotation. Retaining pins or stop pins 25 are arranged in openings in the shank portion 14 to project through the openings 22 at the lower ends of the pins 20 to prevent downward movement or displacement of the pins. It is to be understood that insofar as the present invention is concerned the removable cutter carrying pins 20 may be held or locked in place in any manner in the reamer as originally assembled or manufactured.

The operation of the reamer in the well subjects the cutters 17, the pins 20 and the portions of the body 10 carrying the pins 20 to excessive strains and wear. In practice after a short period of use the openings 21 and 22 carrying the opposite end portions of the pins 20 become enlarged and out of round as illustrated in Fig. 5. The pins 20 may also become worn. When the openings 21 and 22 become worn in this manner it is necessary to discard the body 10 or repair the body so that it may again properly receive and carry the pins 20 or the replacement pins for rotatably supporting the cutters. Heretofore it has been the usual practice to repair reamer bodies worn as described above by building up the parts adjacent the openings by welding and then reboring the openings to receive the cutter carrying pins. This manner of repairing the reamer bodies is very expensive and requires tools and equipment not usually available in small field machine shops, etc.

The method of the present invention as employed to repair the worn reamer shown in the drawing comprises, generally, the removal of the pins 20 from the openings 21 and 22, the drilling or providing of sockets 26 in the body 10 to intersect the openings 21 and 22, securing blocks or inserts 27 in the sockets 26 having openings 32 for receiving the opposite end portions of the cutter carrying pins 20 and then inserting and locking the pins 20 in the openings 32.

The removal of the pins 20 from the openings 21 and 22 may be readily accomplished by first removing the screws or pins 23 and 25 and then driving or moving the pins 20 longitudinally from the openings 21 and 22. The outer ends of the openings 21 and 22 are open and accessible for the easy removal of the pins 20. If the pins 20 are worn to an appreciable extent they may be discarded while the cutters 17 may be resharpened or if they are excessively worn they may be discarded also.

Following the removal of the pins 20 the invention contemplates the providing of the openings or sockets 26 in the body 10 to intersect the openings 20 and 21. It is a feature of the invention that the sockets 26 may be easily and quickly drilled in the body 10 from the surfaces 15 to intersect the openings 21 and 22. The sockets 26 are preferably, though not necessarily, drilled radial relative to the central longitudinal axis of the body 10. Further, it is preferred that the sockets 26 be drilled so that their longitudinal axes are in planes normal to the longitudinal axis of the body. The sockets 26 are drilled sufficiently deep to fully or completely intersect the openings 21 and 22. In carrying out the method the sockets 26 may be formed by common or typical drills to be in the nature of cylindrical bores as shown throughout the drawing. In practice it is preferred to form the sockets 26 comparatively large in diameter. The diameter and depth of the sockets 26 of course depends upon the size of the inserts 27 which are preferably preformed, as will be hereinafter described. The several sockets 26 drilled in the body 10 are preferably of the same diameter and the same depth. In the particular case illustrated in the drawing the sockets 26 are positioned and proportioned so that they join or communicate with the recesses 19 for carrying the thrust washers 9. It is believed that it will be apparent how the sockets 26 may be quickly and easily drilled in the body 10 by common drilling tools.

After the providing or drilling of the sockets 26 the blocks or inserts 27 are inserted in the sockets and secured to the body 10. The inserts 27 are preferably preformed or previously manufactured for the repair of the tools and the sockets 26 are preferably drilled to accurately receive them. The inserts 27 are cylindrical parts which accurately fit the sockets and which have their inner ends bearing on the inner or bottom walls 30 of the sockets. The inserts 27 are preferably proportioned so that their outer ends are flush with the faces 15 and where the faces 15 are rounded the outer ends of the inserts are correspondingly shaped. Where the sockets 26 join the recesses 9, as shown in the drawing, the inserts 27 may have flat faces 31 to form the bottom or inner walls of the recesses 19. In accordance with the invention the inserts 27 have openings 32 extending transversely or diametrically through them. The openings 32 may be of the same diameter as the openings 21 and 22 initially provided in the reamer body 10. When the inserts 27 are inserted in the sockets 26 they are positioned so that their openings 32 are axially aligned with and form continuations of the openings 21 and 22.

Following the inserting and locating of the inserts 27 in the sockets 26 the inserts 27 are secured to the body. It has been found desirable to weld the outer ends of the inserts 27 to the reamer body as at 33. The welds at 33 may be comparatively light as there are practically no forces tending to move the inserts 27 outwardly from the sockets 26. As the inserts 27 are cylindrical and fit the sockets 26 as described above they cannot move inwardly or vertically in either direction in the sockets. It is preferred to form the inserts 27 of hard material to be wear resistant.

When the reamer body 10 has been provided with the blocks or inserts 27 as just described the pins 20 or replacement pins 20 may be arranged in place to rotatably carry the cutters 17. The pins 20 may be easily inserted through the openings 21 or 22 to have their opposite end portions received in the openings 32 of the inserts 27. When the pins 20 are inserted as just described the washers 9 are arranged in the recesses 19 and the cutters 17 are arranged in the recesses 16 so that the pins are passed through their openings to hold them in the assembled relation.

When a pin 20 has been arranged in place where its opposite end portions are received in the openings 32 the pin is secured or locked against rotation and longitudinal movment. Each insert 27 has a relatively small transverse opening 36 which intersects or partially intersects its opening 32. The openings 36 of the several inserts 27 are in the same relative positions and, therefore, the openings 36 are equal distances from the end walls 18 of the recesses 16. Lock pins 37 are arranged in the openings 36 of the upper inserts 27 to cooperate with the notches 24 in the pins 20 to prevent rotation of the pins. Stop pins 38 are arranged in the openings 36 of the lower inserts 27 to enter the openings 32 at the lower ends of the pins 20 to prevent downward movement and displacement of the pins 20. As the openings 36 of the several inserts 27 are equally spaced from the end walls 18 of the recesses 16 the relationship between the lock pins 37 and the stop pins 38 may be reversed when the reamer is turned end for end. That is, when the reamer is to be used with its socket 13 at its upper end and its pin 12 at its lower end the lock pins 37 are arranged in the openings 36 of the inserts 27 adjacent the openings 22 and the stop pins 38 are arranged in the openings 36 of the inserts 27 adjacent the openings 21.

In the event that the body 10 of the reamer does not have openings to permit the insertion of the pins 37 and 38 such openings 40 may be drilled in the triangular portion 14 of the body to permit the easy insertion of the pins. Smaller transverse openings 41 may be provided in the body portion 14 to allow the pins 37 to be driven from the openings 36 through the openings 40 by drift pins or the like. The lock pins 37 and the stop pins 38 are held against loss or displacement by screws 42 threaded into the openings 40. The screws 42 may be locked against unscrewing by cotter keys 43. The screws 42 and the cotter keys 43 are assembled in the body 10 after the insertion of the pins 37 and 38 to hold the said pins in position and thus prevent loss or displacement of the cutter carrying pins 20.

From the above detailed description it will be apparent how a reamer whose pin carrying openings have become worn may be easily and quickly repaired with simple available tools. The sockets 26 and the openings 40 and 41 may be easily drilled in the body 10 and the hardened inserts 27 are easily inserted in the sockets and brought to their proper positions. As described above, very little welding 33 is required to hold the inserts 27 in the sockets 26 as there is little or no tendency for the inserts to move outwardly from the sockets. The inserts 27 in being cylindrical and in being held in cylindrical sockets cannot move vertically or longitudinally of the reamer and the inserts are positively held against inward movement by the walls 30 of the sockets. When the body 10 has been provided with the hardened inserts 27 the pins 20 and cutters 17 may be easily and quickly assembled on the reamer. The hard inserts 27 are long wearing and effectively and dependably support the opposite end portions of the pins 20. In the event that the inserts 27 become worn through use they may be easily removed by cutting out the welding 33 and disengaging them from the sockets 26. The worn inserts 27 may be replaced by new or replacement inserts to recondition the reamer body 10 to again carry the pins 20.

Having described only a typical preferred manner of carrying out the method of my invention, I do not wish to be limited or restricted to the specific details herein set forth, but wish to reserve to myself any variations or modifications that may appear to those skilled in the art or fall within the scope of the following claims.

Having described my invention, I claim:

1. The method of repairing a well reamer body having a worn opening for receiving a cutter supporting pin, said method including, drilling a single hole to form a socket in the body at and intersecting the worn opening, providing an insert having an opening, said insert being of substantially the same size and shape in cross section as said drilled socket, positioning the insert in the said socket where its opening is adapted to receive said pin, and then securing the insert to the body.

2. The method of repairing a well reamer body provided with two spaced parts having worn openings for receiving the end portions of a cutter supporting pin, said method comprising, drilling a single hole in each of said parts to form sockets at and intersecting the said worn openings, providing two inserts each having an opening, said inserts being of substantially the size and cross section as the said drilled sockets, positioning an insert in each of said sockets where their openings are adapted to receive the end portions of the cutter supporting pin, inserting the pin in the openings of the inserts, and then securing the inserts to the said body parts.

ALFRED C. CATLAND.